United States Patent
Machesky

(10) Patent No.: US 9,175,772 B2
(45) Date of Patent: Nov. 3, 2015

(54) EXPANDABLE SEALING WASHER

(76) Inventor: Ralph E. Machesky, Littleton, CO (US)

(*) Notice: Subject to any disclaimer, the term of this patent is extended or adjusted under 35 U.S.C. 154(b) by 0 days.

(21) Appl. No.: 13/214,067

(22) Filed: Aug. 19, 2011

(65) Prior Publication Data

US 2013/0045064 A1 Feb. 21, 2013

(51) Int. Cl.
*F16B 43/00* (2006.01)
*F16L 33/18* (2006.01)
*F16J 15/02* (2006.01)

(52) U.S. Cl.
CPC .......... *F16J 15/024* (2013.01); *F16B 43/001* (2013.01); *F16L 33/18* (2013.01)

(58) Field of Classification Search
USPC ........... 411/542–544, 371.1, 369, 34, 37, 38, 411/19; 285/345, 355, 910; 277/622
See application file for complete search history.

(56) References Cited

U.S. PATENT DOCUMENTS

| | | | | |
|---|---|---|---|---|
| 579,643 | A * | 3/1897 | Gleason | 285/330 |
| 1,966,202 | A * | 7/1934 | Pfefferle | 277/605 |
| 2,257,538 | A * | 9/1941 | Schlueter | 411/34 |
| 2,542,967 | A * | 2/1951 | Waechter | 248/188.5 |
| 2,666,354 | A * | 1/1954 | Dim et al. | 411/371.1 |
| 2,727,738 | A | 12/1955 | Lindley | |
| 2,814,514 | A | 11/1957 | Beatty | |
| 2,871,031 | A * | 1/1959 | Altemus et al. | 285/18 |
| 3,169,025 | A | 2/1965 | Borah | 277/627 |
| 3,299,766 | A * | 1/1967 | Gould et al. | 411/371.1 |
| 3,457,825 | A * | 7/1969 | Caty | 411/544 |
| 3,792,834 | A * | 2/1974 | Billeter | 251/148 |
| 3,891,224 | A * | 6/1975 | Ditcher | 277/605 |
| 4,322,193 | A * | 3/1982 | Stahl | 411/11 |
| 4,350,351 | A * | 9/1982 | Martin | 277/606 |
| 4,436,312 | A | 3/1984 | Davis et al. | |
| 4,447,484 | A | 5/1984 | Slosberg et al. | |
| 4,592,390 | A | 6/1986 | Boyd | |
| 4,739,979 | A | 4/1988 | Kanda | |
| 5,281,065 | A * | 1/1994 | Wu | 411/258 |
| 5,753,061 | A | 5/1998 | Rudy | |
| 6,425,718 | B1 * | 7/2002 | Herr et al. | 411/10 |
| 2005/0013107 | A1 | 1/2005 | Desai et al. | |

FOREIGN PATENT DOCUMENTS

| | | |
|---|---|---|
| EP | 0110233 | 6/1984 |
| FR | 2786838 A1 | 6/2000 |
| GB | 725112 | 3/1955 |

OTHER PUBLICATIONS

International Search Report for International application No. PCT/US12/51437, filed Aug. 17, 2012.

* cited by examiner

*Primary Examiner* — Flemming Saether
(74) *Attorney, Agent, or Firm* — Holland & Hart LLP

(57) ABSTRACT

An expandable washer apparatus is formed from a resilient elastomeric annular body having an opening therethrough, an upper surface, a lower surface, and an external cylindrical surface. A plurality of cavities extend around the external cylindrical surface. A plurality of cavity sidewalls are associated with the plurality of cavities, the plurality of sidewalls expanding outward to increase the external cylindrical surface circumference when pressure is applied to the upper and lower surfaces.

19 Claims, 8 Drawing Sheets

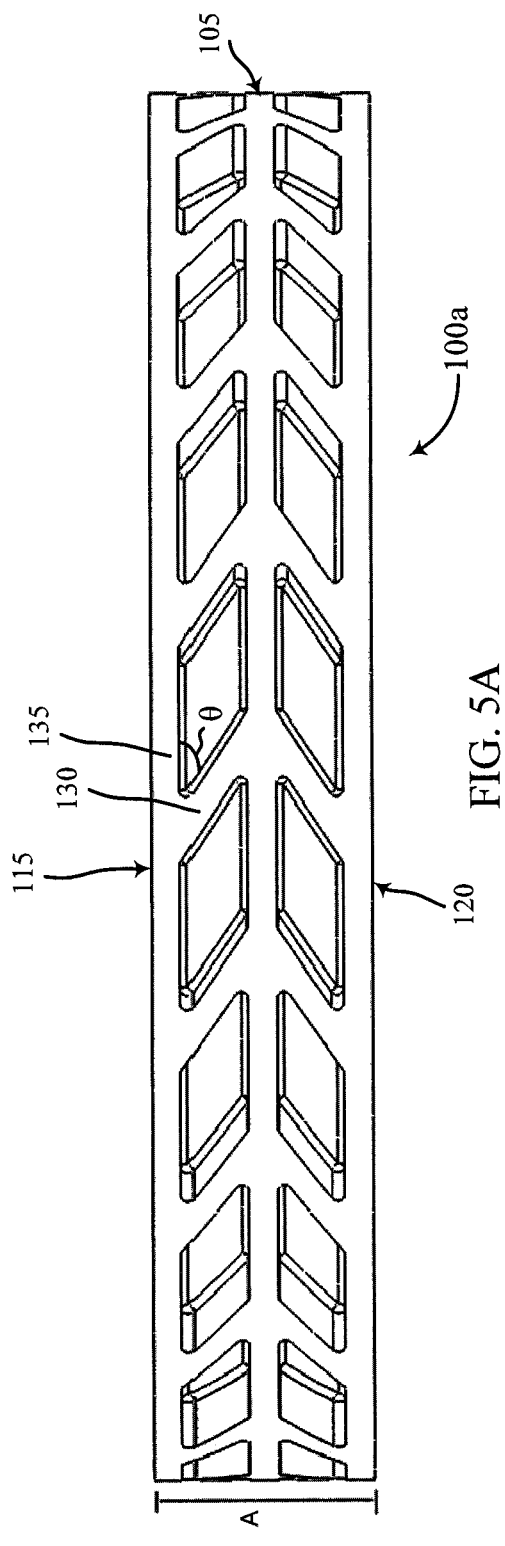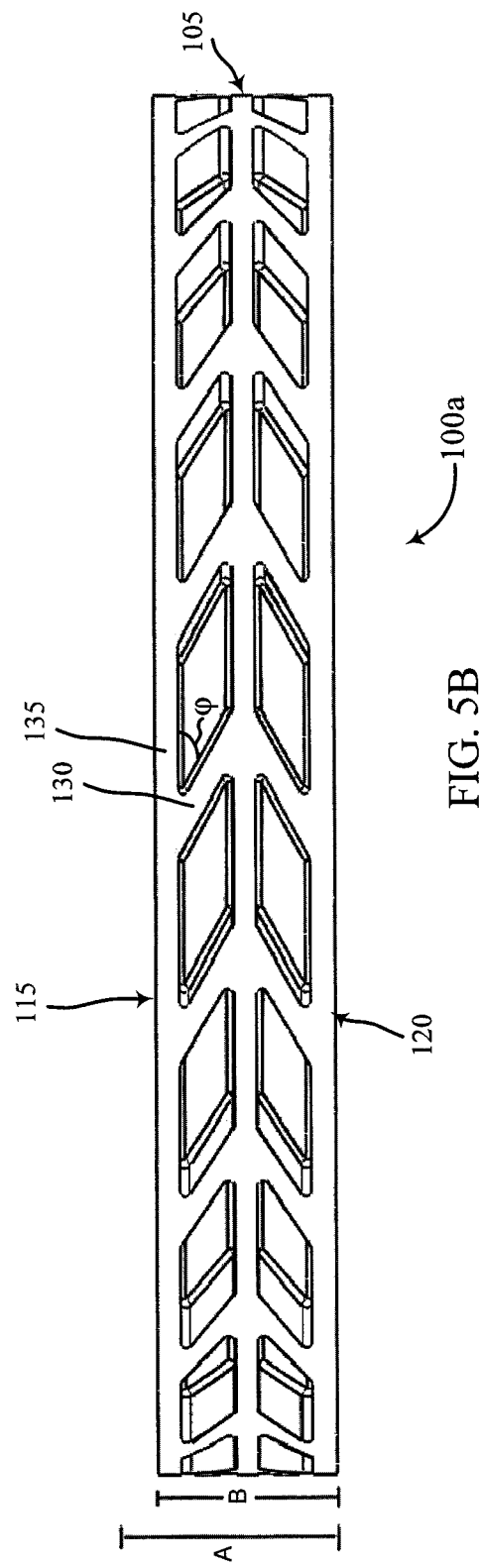
FIG. 5A
FIG. 5B

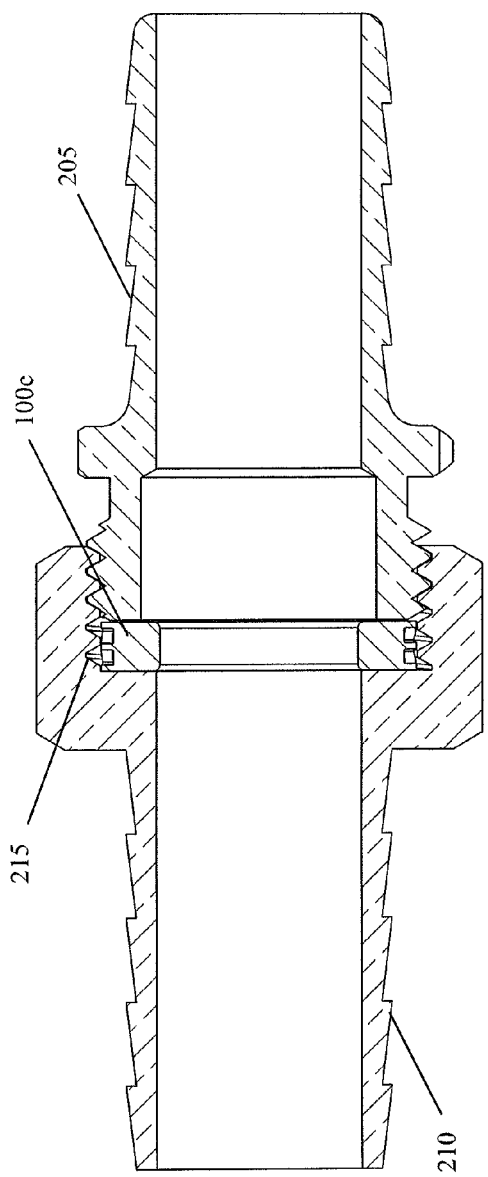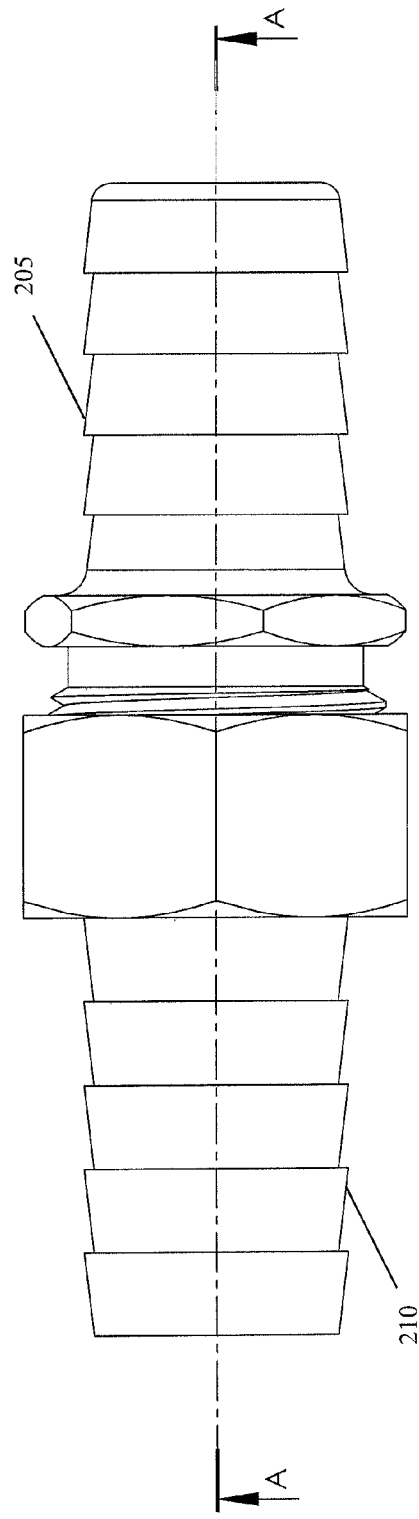
FIG. 7B
FIG. 7A

EXPANDABLE SEALING WASHER

BACKGROUND

The present disclosure is directed to sealing washers, and more specifically to sealing washers that expand in circumference when compressed.

A common and recurring issue in fluid connections is leakage. For example, in garden hoses leaks at hose fittings coupling a hose to another hose, a spigot, or nozzle, for example, commonly leak water. The hoses themselves may not always leak, but in many cases the connecting hardware leaks water. Commonly, such connections will leak water regardless of how tightly the two parts, namely the male hose fitting and female hose fitting, of the connection are threaded together. This is largely attributed to the fact that the manufacturers of hoses and other related equipment having female hose fittings generally use one of two main types of washers in the connections, flat or O-ring washers. Such flat or O-ring washers are generally made from natural rubber or plastics.

While the materials of traditional washers may be different, both are similar in size and shape and both have serious shortcomings. The natural rubber washers may work at first, but as time goes on, they become brittle, and can even crack. This often results due to natural rubber being subjected to high pressure water and widely varying temperatures. For example, a garden hose that is left full of water out in the summer's sun, can become extremely hot. This hot water accelerates the breakdown of the natural rubber. Plastic washers commonly have similar performance and can break down after being subjected to high pressures and/or temperatures for an extended period. Furthermore, such washers may become less effective over longer periods of use even without being subject to high pressures and/or temperatures.

Furthermore, the design of hose washers for years has been the same as a common metal washer. Such washers generally comprise a basic, flattened cylinder, or an o-ring. Since hoses use threads on their male and female fittings to enable connections, the threads themselves are many times the source of a water leak. Commonly a shoulder portion of the female hose fitting, or the end portion of a male fitting, have an uneven or otherwise imperfect surface that will contact the main seating area of the washer. In some cases, the hose washer itself has an imperfect seating area. In other cases, dirt or debris may be present in or on the female or male fittings, or on the hose washer itself. In such situations, the main seating area of the hose washer may not properly seal, allowing water to bypass the seal and makes its way out of the connection via the hose connection threads.

Such leaks in some situations may cause a minor nuisance, but in many cases leaks can also present safety concerns, can result in potential property damage (particularly if the hose is used in an interior of a business or residence), and can result in wasted water.

SUMMARY

Methods, systems, and devices are described for providing enhanced sealing in fluid connections.

The present disclosure provides, in various aspects, an expandable washer apparatus, comprising a resilient elastomeric annular body having an opening therethrough, an upper surface, a lower surface, and an external cylindrical surface. In one embodiment, a plurality of cavities extend around the external cylindrical surface. A plurality of cavity sidewalls are associated with the plurality of cavities, the plurality of sidewalls expanding outward to increase the external cylindrical surface circumference when pressure is applied to the upper and lower surfaces. One or more of the plurality of cavity sidewalls extend from the upper surface toward the lower surface at an angle other than 90 degrees relative to the upper surface, and in some cases the sidewalls are not linear, but instead curve away from the upper and/or lower surface, and may also curve away from the external cylindrical surface.

In one embodiment, the plurality of cavities comprise a first plurality of cavities extending around an upper portion of the external cylindrical surface, and a second plurality of cavities extending around a lower portion of the external cylindrical surface. Each of the first plurality of cavities in such an embodiment may comprise parallel top and bottom walls and parallel sidewalls, and each of the second plurality of cavities may comprise parallel top and bottom walls and parallel sidewalls. An intermediate strip may extend around the external cylindrical surface, formed from the bottom walls of the first plurality of cavities and the top walls of the second plurality of cavities. In some embodiments, the sidewalls of the first plurality of cavities extend from the upper surface to the intermediate strip at a first slope relative to the upper surface, and the sidewalls of the second plurality of cavities are arranged at a slope that is different than the first slope. The sidewalls of the first cavities and the sidewalls of the second cavities, in some embodiments, form a herringbone pattern around the external cylindrical surface.

The resilient elastomeric annular body is formed from a silicone material according to some embodiments. In other embodiments, the resilient elastomeric annular body has a hardness between about 40 and 70 durometer.

In another aspect, the present disclosure provides an expandable washer apparatus, comprising a resilient elastomeric annular body having an opening therethrough, an upper surface, a lower surface, and an external cylindrical surface. One or more cavities are present in the external cylindrical surface, and a resilient elastomeric skin covers the one or more cavities. The resilient elastomeric skin expands outward to increase the external cylindrical surface circumference when pressure is applied to the upper and lower surfaces. The one or more cavities may be filled with a fluid, gel or one or more gasses.

In some embodiments of this aspect, the one or more cavities comprise a first plurality of cavities extending around an upper portion of the external cylindrical surface, and a second plurality of cavities extending around a lower portion of the external cylindrical surface. Each of the first plurality of cavities may comprise parallel top and bottom walls and parallel sidewalls, and each of the second plurality of cavities may comprise parallel top and bottom walls and parallel sidewalls. An intermediate strip may be formed from the bottom walls of the first plurality of cavities and the top walls of the second plurality of cavities.

BRIEF DESCRIPTION OF THE DRAWINGS

A further understanding of the nature and advantages of the present invention may be realized by reference to the following drawings. In the appended figures, similar components or features may have the same reference label.

FIG. 5A is a side plan view of an expandable sealing washer according to an embodiment;

FIG. 5B is a side plan view of an expandable sealing washer under compression according to an embodiment.

FIGS. 7A-7C are illustrations of an expandable sealing washer in a threaded connection according to an embodiment

DETAILED DESCRIPTION

Figure 1:
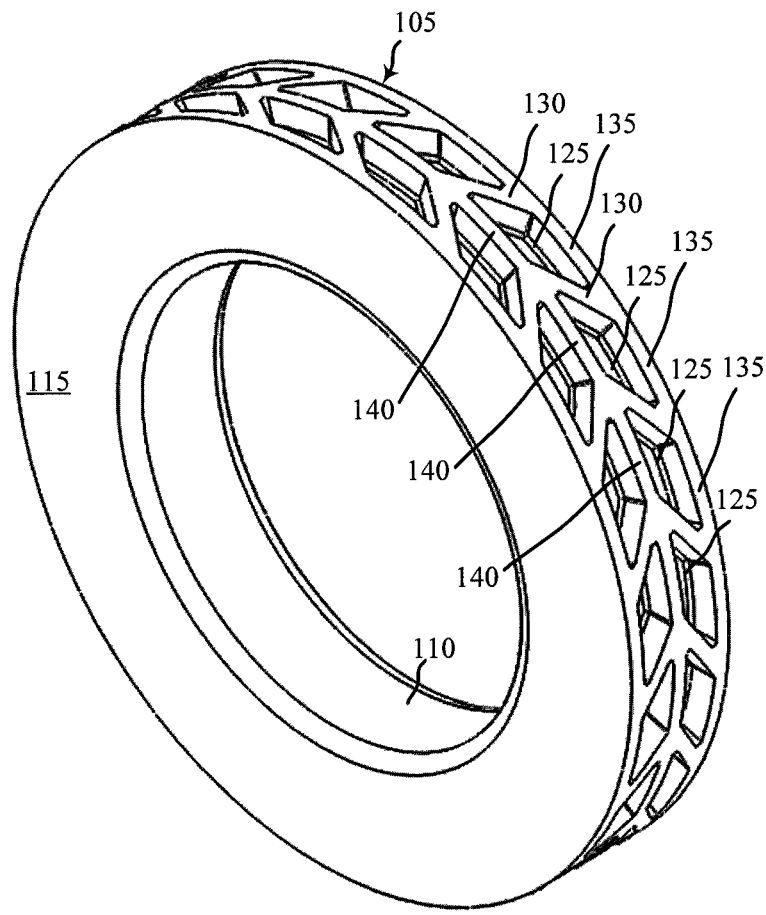
FIG. 1 is a perspective illustration of an expandable sealing washer according to an embodiment.
Figure 2:
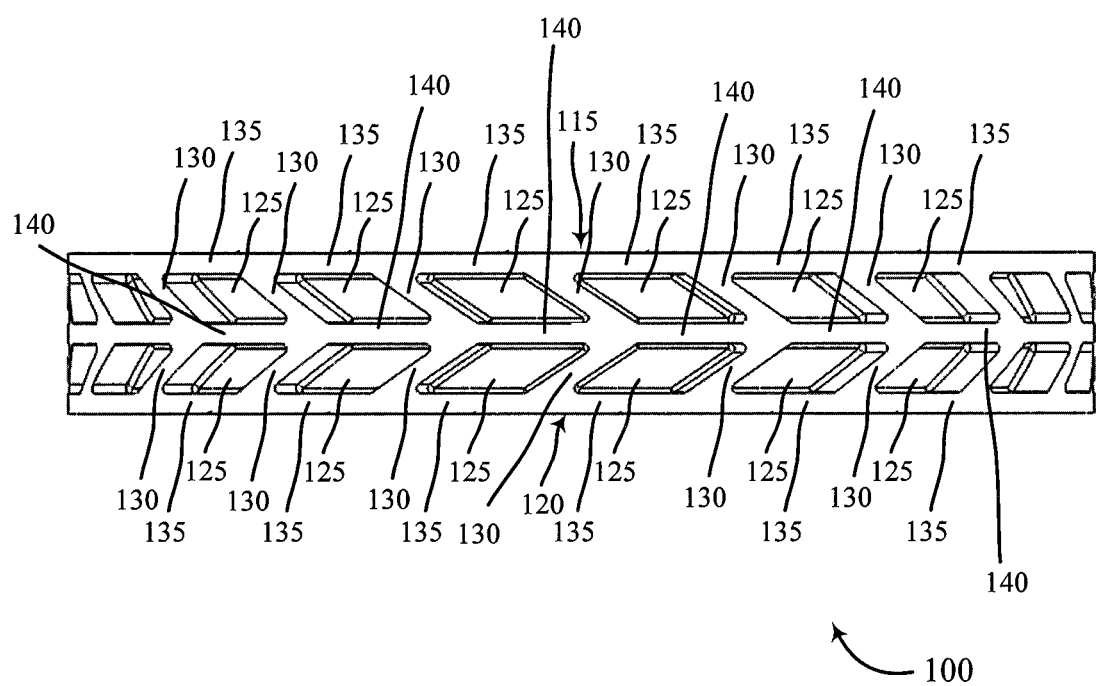
FIG. 2 is a side plan view of an expandable sealing washer according to an embodiment.
Figure 3:
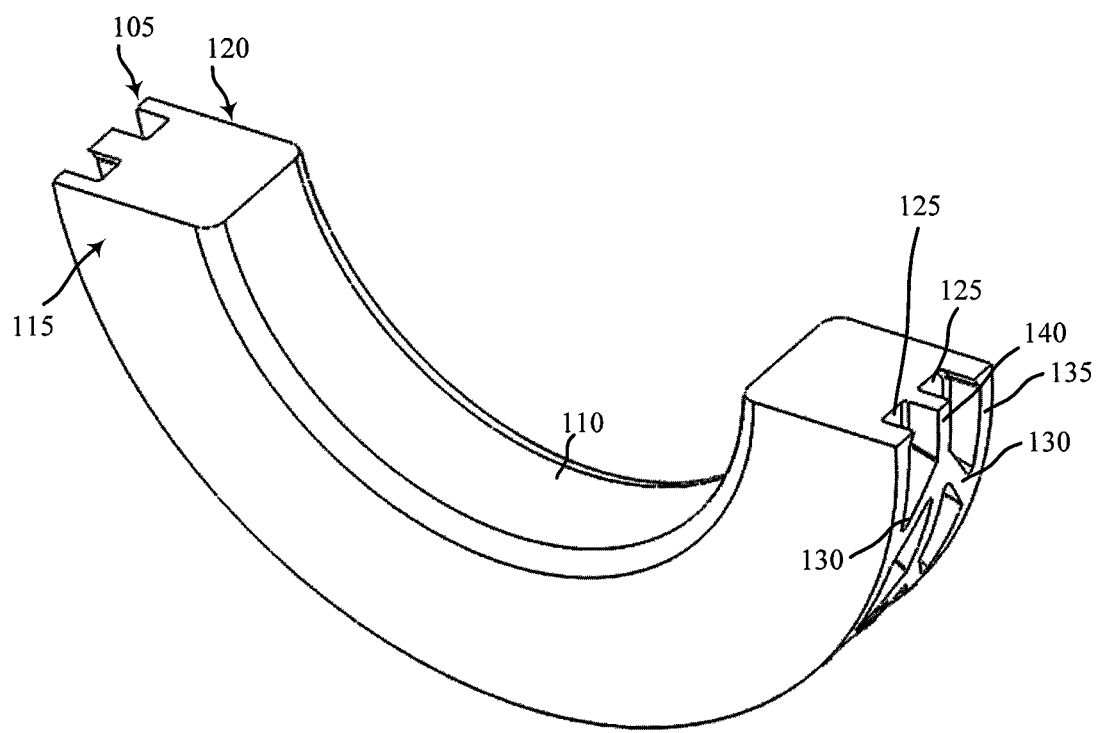
FIG. 3 is a horizontal cross-sectional illustration of an expandable sealing washer according to an embodiment.
Figure 4:
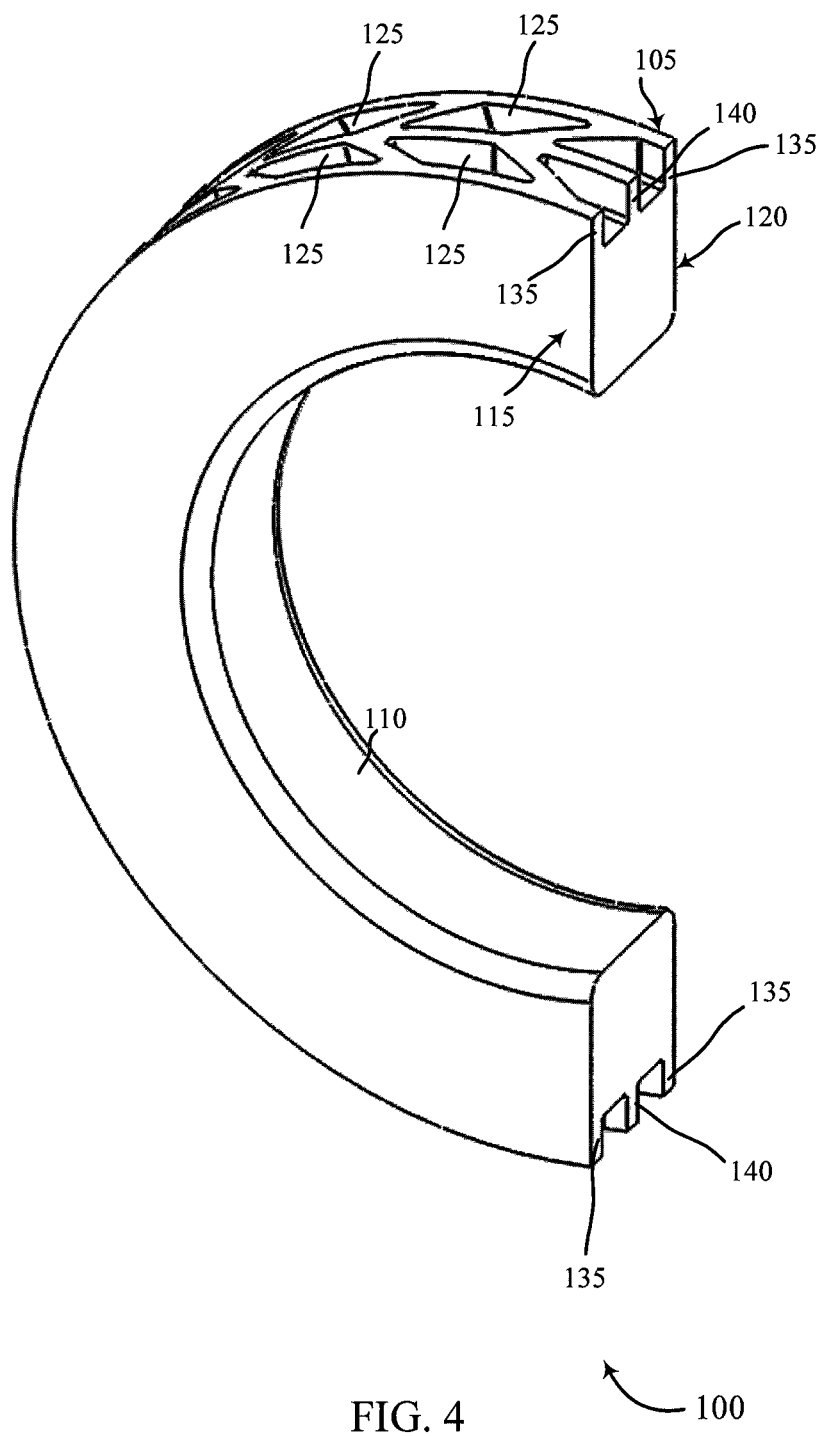
FIG. 4 is a vertical cross-sectional illustration of an expandable sealing washer according to an embodiment.

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that aspects and elements described with respect to certain embodiments may be combined in various other embodiments. It should also be appreciated that the following exemplary embodiments may individually or collectively be components of a larger system, wherein other procedures may take precedence over or otherwise modify their application.

The present disclosure relates to an expandable sealing washer which addresses and overcomes of the shortcomings commonly associated with traditional sealing washers. Various exemplary embodiments allows for irregular or deformed connection surfaces. Various examples provide a circular, flattened ring shape from both the top and bottom. The vertical edge of the washer includes features that enhance sealing capabilities of the washer. In some exemplary embodiments, the vertical edge, also referred to as the external cylindrical surface, includes a series of cavities formed in a symmetrical pattern designed for both opposing crushing forces and gas or liquids containment. The cavities effectively form a series of cells or sections. The walls of these cells, in various embodiments, are thin and flexible, allowing them to conform to the threads on the inside of a threaded connection. when the washer is compressed.

For example, a user may insert the expandable sealing washer into a threaded hose opening and tighten the connection. This places an opposing crushing force on both of the generally flat sides of the washer. The washer is formed from a material that is firm, yet pliable and this allows it to expand in diameter. As the expandable sealing washer diameter increases, the symmetrical cells push outwards and conform to the threads on the inside of a threaded connection. In some embodiments, the washer is formed from a silicone type rubber that resists extreme heat, cold and cracking. The symmetrically designed external cylindrical surface, combined with silicone materials, makes such an expandable sealing washer an enhanced sealing mechanism for use in connections on pipes or hoses where a simple flat washer may have been used traditionally. Such a washer may be used in traditional hose connections commonly found in residential structures, as well as other fluid or gas connections that may be found in residential, commercial, or industrial settings.

With reference now to FIGS. 1-4, a washer 100 of one exemplary embodiment is described. The washer 100 includes an external cylindrical surface 105, and has an opening therethrough formed from interior surface 110. While illustrated as a vertical surface, the exterior cylindrical surface 105 may by non-vertical, or raduised, and still function in a manner as described herein. An upper surface 115, and a lower surface 120 form main seating surfaces for the washer 100. A plurality of cavities 125 extend around the external cylindrical surface 105. The cavities 125 in this embodiment are formed of symmetrically arranged sidewalls 130, and have a top wall 135 and a bottom wall 140. The bottom wall 140 of the cavities 120, in this embodiment, form an annular ridge that extends around an intermediate portion of the external cylindrical surface 105.

Figure 6:
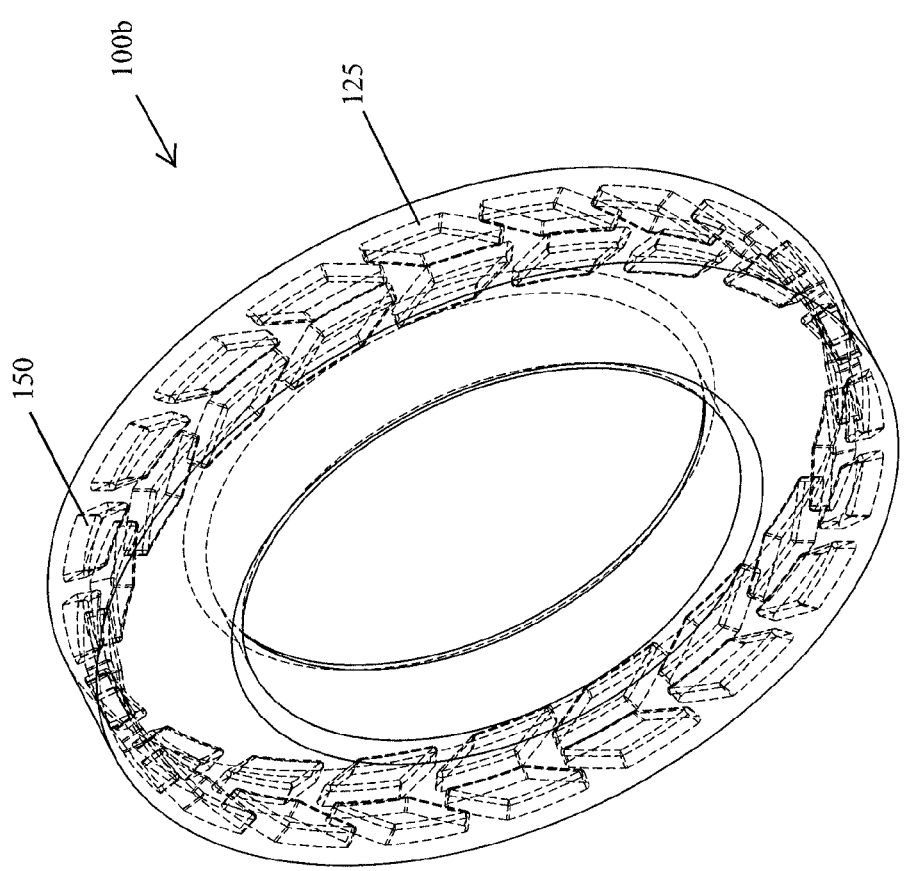
FIG. 6 is a perspective view of a skin-covered and fluid or gel filled washer according to an embodiment.

Thus, in this embodiment, cavities 125, and their associated sidewalls 130, and top and bottom walls 135, 140, are arranged a symmetrical herringbone pattern that has open faced cells spaced radially along the external cylindrical surface 105 of the expandable sealing washer 100. In an alternate embodiment, the open facing cells or sections are 'skinned' over or covered with a thin layer of pliable material, such as silicone material. An example of such an alternate embodiment is illustrated in FIG. 6, in which washer 100b has a silicone skin 150 and cavities 125 are filled with gel or liquid. This creates small sealed, yet flexible, cells or sections. As the expandable sealing washer 100 diameter increases, the symmetrical herringbone pattern of the sidewalls 130 conform to the threads on the inside of a threaded connection. The cells or sections can simply be hollow and use the trapped air inside each section to expand the thin outer cell wall, or they can be filled with a flexible silicone type gel (or other type of gel or fluid) that expands and contracts as the expandable sealing washer diameter increases. In either case, as the threaded connection is loosened, the expandable sealing washer 100 diameter decreases, allowing for easier removal from the fitting in which the washer is seated. The washer 100, in one embodiment, is formed from a silicone material and has a hardness of between 40 and 70 durometer. In one embodiment, the washer 100 is formed of silicone material and has a hardness of about 60 durometer. Such a hardness allows the washer 100 to be suitably pliable allowing for the external cylindrical surface 105 to expand in diameter when the washer 100 is compressed, yet providing sufficient stiffness to withstand the shear forces present when, for example, hose male and female fittings are threaded together.

While FIGS. 1-4 illustrate a washer having two symmetrically arranged rows of cavities, numerous different variations are possible that achieve the results described above. For example, a single row of cavities may be present, or more than two rows of cavities may be present. The rows of cavities may be arranged in an offset manner, where sidewall ends may not necessarily be aligned between upper and lower rows of cavities. Furthermore, cavities may take numerous different shapes and sizes.

With reference now to FIGS. 5A and 5B, an exemplary washer 100a is illustrated in an uncompressed state (FIG. 5A) and in a compressed state (FIG. 5B). When the washer 100a is uncompressed, according to this embodiment, the washer 100a has a height A, as indicated in FIGS. 5A and 5B. When the washer 100a is compressed, it has a compressed height B, as indicated in FIG. 5B. Compression may occur through the threading of a male and female fitting together, for example, with the fittings applying pressure to the upper surface 115 and lower surface 120. The washer 100a, in some embodiments, may be compressed by up to 10% of the uncompressed washer height A. This is a greater compression than provided by typical traditional hose washers or O-rings, which commonly specify a compression of no more than 5%. Furthermore, due to the cellular structure of the external surface, such levels of compression may be obtained with a relatively low amount of torque being applied to, for example, a female threaded hose fitting.

As the washer 100a is compressed, the exterior cylindrical surface 105 increases in circumference. The increase in external cylindrical surface 105 circumference will force the external cylindrical surface against, for example, the threads of a female hose fitting, thereby enhancing the seal between the male and female fittings. Thus, in cases where the washer 100a is located in a female fitting, the external surface 105 circumference increases up to the amount permitted by the sidewalls of the female fitting that the external surface 105 comes into contact with. As can further be observed from the illustrations in FIGS. 5A and 5B, in this embodiment sidewalls 130 extend from top walls 135 at an angle θ. When the washer 100a is compressed, the angle between sidewalls 130 and top walls 135 is reduced to angle ϕ. The angle θ may be a fairly wide range of angles other than 90 degrees and achieve the described functions. Furthermore, as mentioned above, sidewalls 130 need not necessarily be linear, and may be radiused or piecewise linear, for example.

Figure 7C:
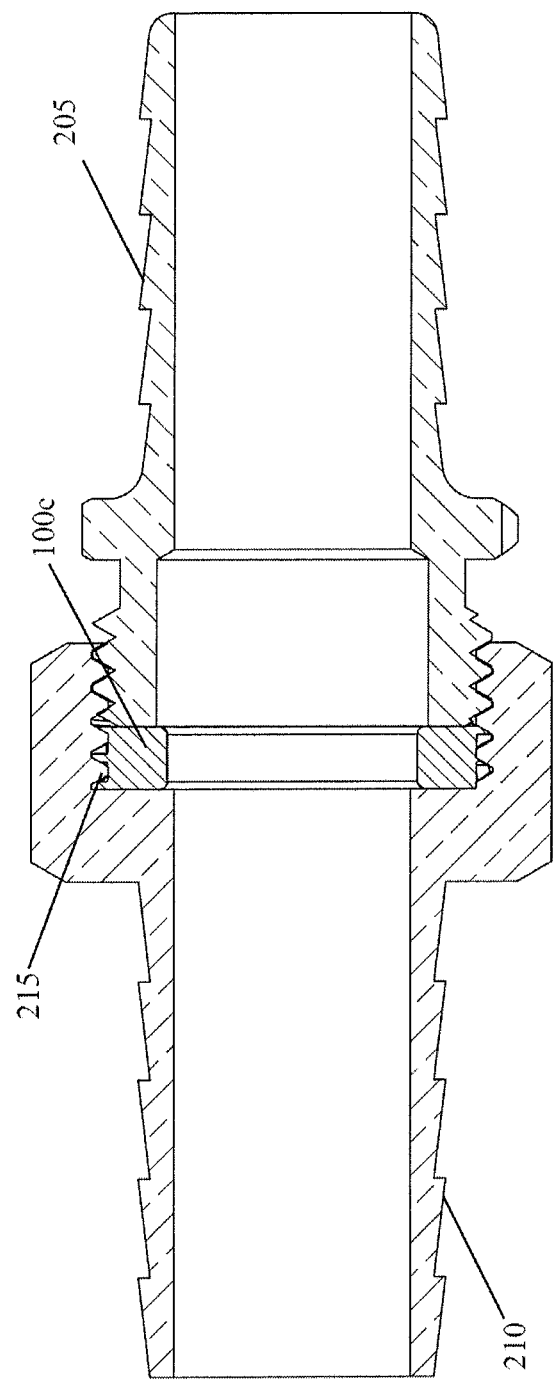

FIGS. 7A through 7C illustrate a washer 100c and a threaded connection. Threaded connection includes a pale end 205 and a female end 210, in which threads 215 are used to secure the ends 205, 210 together. FIG. 7A illustrates a side elevation view, with FIGS. 7B and 7C being cross section views along section A-A of FIG. 7A. In FIG. 7B washer 100c is in an uncompressed state, and the washer 100-c does not extend into the threads 215. In FIG. 7C, the washer 100c is in a compressed state, and the washer 100-c sidewalls expand outwardly to extend into the threads 215 and enhance the seal of the threaded connection.

It should be noted that the devices discussed above are intended merely to be examples. It must be stressed that various embodiments may omit, substitute, or add various features or components as appropriate. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known structural elements and techniques have been shown without unnecessary detail in order to avoid obscuring the embodiments.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Accordingly, the above description should not be taken as limiting the scope of the invention.

What is claimed is:

1. An expandable washer apparatus, comprising:
a resilient elastomeric annular body having an opening therethrough, an upper surface, a lower surface, and an external cylindrical surface;
a plurality of cavities extending around the external cylindrical surface; and
a plurality of cavity sidewalls associated with the plurality of cavities, the plurality of sidewalls configured to expand outwardly to increase the external cylindrical surface circumference when pressure is applied to the upper and lower surfaces, wherein at least a subset of the plurality of cavity sidewalls extend from the upper surface toward the lower surface at an angle other than 90 degrees relative to the upper surface.

2. The apparatus of claim 1, wherein the plurality of cavities comprise: a first plurality of cavities extending around an upper portion of the external cylindrical surface; a second plurality of cavities extending around a lower portion of the external cylindrical surface.

3. The apparatus of claim 2, wherein each of the first plurality of cavities comprise parallel top and bottom walls and parallel sidewalls, and each of the second plurality of cavities comprise parallel top and bottom walls and parallel sidewalls, and wherein an intermediate strip extending around the external cylindrical surface is formed from the bottom walls of the first plurality of cavities and the top walls of the second plurality of cavities.

4. The apparatus of claim 3, wherein the sidewalls of the first plurality of cavities extend from the upper surface to the intermediate strip at a first slope relative to the upper surface, and the sidewalls of the second plurality of cavities are arranged at a slope that is different than the first slope.

5. The apparatus of claim 3, wherein the sidewalls of consecutive first cavities are aligned with the sidewalls of consecutive second cavities.

6. The apparatus of claim 3, wherein the sidewalls of the first cavities and the sidewalls of the second cavities form a herringbone pattern around the external cylindrical surface.

7. The apparatus of claim 1, wherein the resilient elastomeric annular body is formed from a silicone material.

8. The apparatus of claim 1, wherein the resilient elastomeric annular body has a hardness between about 40 and 70 durometer.

9. A washer apparatus, comprising:
a resilient elastomeric annular body having an opening therethrough, an upper surface, a lower surface, and an external cylindrical surface;
a first plurality of cavities extending around an upper portion of the external cylindrical surface separated by a plurality of first sidewalls, wherein at least a subset of the plurality of first sidewalls extend from the upper surface toward the lower surface at an angle other than 90 degrees relative to the upper surface;
a second plurality of cavities extending around a lower portion of the external cylindrical surface separated by a plurality of second sidewalls; and
an annular ridge extending around the external surface formed from the bottom walls of the first plurality of cavities and the top walls of the second plurality of cavities, the annular ridge and plurality of first and second sidewalls configured to expand outwardly to increase the external surface circumference when pressure is applied to the upper and lower surfaces.

10. The apparatus of claim 9, wherein each of the plurality of first sidewalls are substantially parallel to other sidewalls of the plurality of first sidewalls.

11. The apparatus of claim 9, wherein consecutive sidewalls of the first plurality of sidewalls are not parallel, and consecutive sidewalls of the second plurality of sidewalls are not parallel.

12. The apparatus of claim 9, wherein the consecutive first sidewalls are aligned with consecutive second sidewalls and form a herringbone pattern around the external surface.

13. The apparatus of claim 9, wherein the resilient elastomeric annular body is formed from a silicone material.

14. The apparatus of claim 9, wherein the resilient elastomeric annular body has a hardness between about 40 and 70 durometer.

15. An expandable washer apparatus, comprising:
a resilient elastomeric annular body having an opening therethrough, an upper surface, a lower surface, and an external cylindrical surface;
a plurality of adjacent cavities extending around the external cylindrical surface, wherein at least a subset of the plurality of adjacent cavities extend from the upper surface toward the lower surface at an angle other than 90 degrees relative to the upper surface; and
a resilient elastomeric skin covering the plurality of cavities, the resilient elastomeric skin configured to expand outwardly to increase the external cylindrical surface circumference when pressure is applied to the upper and lower surfaces.

16. The apparatus of claim 15, wherein the one or more cavities is filled with a fluid or gel.

17. The apparatus of claim 15, wherein the one or more cavities is filled with one or more gasses.

18. The apparatus of claim 15, wherein the plurality of cavities comprise: a first plurality of cavities extending around an upper portion of the external cylindrical surface; a second plurality of cavities extending around a lower portion of the external cylindrical surface.

19. The apparatus of claim 18, wherein each of the first plurality of cavities comprise parallel top and bottom walls and parallel sidewalls, and each of the second plurality of cavities comprise parallel top and bottom walls and parallel sidewalls, and wherein an intermediate strip is formed from the bottom walls of the first plurality of cavities and the top walls of the second plurality of cavities.

* * * * *